(12) United States Patent
Kuramoto

(10) Patent No.: US 12,549,469 B2
(45) Date of Patent: Feb. 10, 2026

(54) LOGICAL NETWORK CONSTRUCTION SYSTEM, GATEWAY DEVICE, CONTROLLER, AND LOGICAL NETWORK CONSTRUCTION METHOD

(71) Applicant: NEC Corporation, Tokyo (JP)

(72) Inventor: Shinya Kuramoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 638 days.

(21) Appl. No.: 17/909,485

(22) PCT Filed: Dec. 10, 2020

(86) PCT No.: PCT/JP2020/046061
§ 371 (c)(1),
(2) Date: Sep. 6, 2022

(87) PCT Pub. No.: WO2021/186810
PCT Pub. Date: Sep. 23, 2021

(65) Prior Publication Data
US 2023/0155918 A1    May 18, 2023

(30) Foreign Application Priority Data
Mar. 17, 2020   (JP) ................. 2020-046027

(51) Int. Cl.
*H04L 12/66* (2006.01)
*H04L 12/46* (2006.01)
(Continued)

(52) U.S. Cl.
CPC ............. *H04L 45/04* (2013.01); *H04L 12/46* (2013.01); *H04L 45/745* (2013.01)

(58) Field of Classification Search
CPC .. H04M 7/006; H04M 7/1255; H04M 7/1245; H04M 3/54; H04M 15/56;
(Continued)

(56) References Cited

U.S. PATENT DOCUMENTS 6,578,087 B1    6/2003  Garakani et al.
6,904,017 B1 *  6/2005  Meempat .............. H04L 65/104
                                              370/252

(Continued)

FOREIGN PATENT DOCUMENTS

JP    2011-061874 A    3/2011
JP    2012-114714 A    6/2012
(Continued)

OTHER PUBLICATIONS

International Search Report for PCT Application No. PCT/JP2020/046061, mailed on Feb. 22, 2021.
(Continued)

*Primary Examiner* — Kharye Pope

(57) ABSTRACT

An object is to provide a logical network construction system.
A logical network construction system is provided with first and second gateway devices and a controller which communicate with each other via a network, a source device, a destination device, and a storage unit in which an entire device connection list and an entire route definition list are stored. A controller constructs a logical network for communication between a source device connected to a first port of a first gateway device and a destination device connected to a second port of a second gateway device on the basis of an entire device connection list and an entire route definition list.

9 Claims, 9 Drawing Sheets

(51) Int. Cl.
*H04L 45/02* (2022.01)
*H04L 45/745* (2022.01)

(58) Field of Classification Search
CPC ......... H04M 2215/202; H04L 65/1069; H04L 65/1101; H04L 65/1026; H04L 65/1036; H04L 12/66; H04L 65/1104; H04L 65/1043; H04L 69/08; H04L 65/401; H04L 65/1106; H04L 65/1083; H04L 2012/6472; H04L 69/085; H04Q 3/0025; H04Q 3/0062; H04Q 3/0029; H04Q 2213/13196
See application file for complete search history.

(56) References Cited

U.S. PATENT DOCUMENTS

| | | | |
|---|---|---|---|
| 9,246,802 B2 | 1/2016 | Angst et al. | |
| 9,319,531 B1* | 4/2016 | Capper | H04L 65/1026 |
| 2002/0141389 A1* | 10/2002 | Fangman | H04L 65/65 |
| | | | 370/352 |
| 2006/0013195 A1* | 1/2006 | Son | H04M 7/006 |
| | | | 370/352 |
| 2007/0280289 A1* | 12/2007 | Konda | H04L 47/724 |
| | | | 370/468 |
| 2008/0049621 A1 | 2/2008 | Mcguire et al. | |
| 2009/0010168 A1* | 1/2009 | Yurchenko | H04L 47/122 |
| | | | 370/237 |
| 2009/0129374 A1* | 5/2009 | Yurchenko | H04M 7/1245 |
| | | | 370/352 |
| 2012/0240232 A1 | 9/2012 | Azum | |
| 2015/0263952 A1 | 9/2015 | Ganichev et al. | |
| 2019/0058695 A1 | 2/2019 | Takajo et al. | |
| 2020/0076733 A1* | 3/2020 | Venkataraman | H04L 45/74 |

FOREIGN PATENT DOCUMENTS

| | | |
|---|---|---|
| JP | 2012-198659 A | 10/2012 |
| JP | 2017-216526 A | 12/2017 |
| JP | 2019-201428 A | 11/2019 |

OTHER PUBLICATIONS

JP Office Action for JP Application No. 2022-508057, mailed on Sep. 26, 2023 with English Translation.
Extended European Search Report for EP Application No. 20925873.0, dated on Jul. 18, 2023.

* cited by examiner

LOGICAL NETWORK CONSTRUCTION SYSTEM, GATEWAY DEVICE, CONTROLLER, AND LOGICAL NETWORK CONSTRUCTION METHOD

This application is a National Stage Entry of PCT/JP2020/046061 filed on Dec. 10, 2020, which claims priority from Japanese Patent Application 2020-046027 filed on Mar. 17, 2020, the contents of all of which are incorporated herein by reference, in their entirety.

TECHNICAL FIELD

The present disclosure relates to a logical network construction system, a gateway device, a controller, and a logical network construction method.

BACKGROUND ART

There is known a network system which connects to a network, acquires an ID from a device (embedded device) which has made a connection request, performs authentication based on the acquired ID, and when the authentication is successful, communicates between the device and another device (isolated device) connected to the network (See, for example, Patent Literature 1).

CITATION LIST

Patent Literature

Patent Literature 1: Japanese Unexamined Patent Application Publication No. 2012-198659

SUMMARY OF INVENTION

Technical Problem

However, Patent Document 1 does not propose a mechanism for performing communication between a device connected to any gateway device among a plurality of gateway devices connected to a network and capable of communicating with each other and a device connected to any other gateway device.

An object of the present disclosure is to provide a logical network construction system, a gateway device, a controller, and a logical network construction method capable of performing communication between a device connected to one gateway device and a device connected to the other gateway device.

Solution to Problem

A logical network construction system of the present disclosure includes: a first gateway device, a second gateway device, and a controller connected to a network and communicating with each other via the network; a transmission source device connected to a first port of the first gateway device and communicating with the first gateway device; a destination device connected to a second port of the second gateway device and communicating with the second gateway device; a storage unit in which an entire device connection list and an entire route definition list are stored; wherein in the entire device connection list, connection information for specifying the first gateway device to which the transmission source device is connected and the second gateway device to which the destination device is connected is registered, in the entire route definition list, information for specifying the destination device with which the transmission source device should communicate is registered, and the controller constructs a logical network for communication between the source device connected to the first port of the first gateway device and the destination device connected to the second port of the second gateway device based on the entire device connection list and the entire route definition list.

A gateway device of the present disclosure includes: a storage unit that stores a first route definition list in which the device identifier of the source device, the device identifier of the destination device, and the network address of the transfer destination gateway device are registered in association with each other, and a first device connection list in which the port identifier of the first port and the device identifier of the source device are registered in association with each other; wherein the transfer destination gateway device is specified by referring to the first route definition list and the first device connection list, and the communication between the transmission source device and the transfer source gateway device is transferred to the specified transfer destination gateway device.

A gateway device of the present disclosure includes: a storage unit that stores an entire device connection list and an entire route definition list in which information for specifying the destination device with which the source device is to communicate is registered in which connection information for specifying a first gateway device to which a source device is connected and a second gateway device to which a destination device is connected is registered; wherein on the basis of the entire device connection list and the entire route definition list, an instruction for constructing a logical network for communication between the source device connected to the first port of the first gateway and the destination device connected to the second port of the second gateway is transmitted to the first gateway device and the second gateway device.

A logical network construction method of the present constructs a logical network for communication between the source device connected to the first port of the first gateway and the destination device connected to the second port of the second gateway based on an entire device connection list in which connection information for specifying a first gateway device to which a source device is connected and a second gateway device to which a destination device is connected is registered, and a route definition list in which information for specifying a destination device to which the source device is to communicate is registered.

Advantageous Effects of Invention

According to the present disclosure, it is possible to provide a logical network construction system, a gateway device, a controller, and a logical network construction method capable of performing communication between a device connected to one gateway device and a device connected to the other gateway device.

EXAMPLE EMBODIMENT

Embodiment 1

Figure 1:
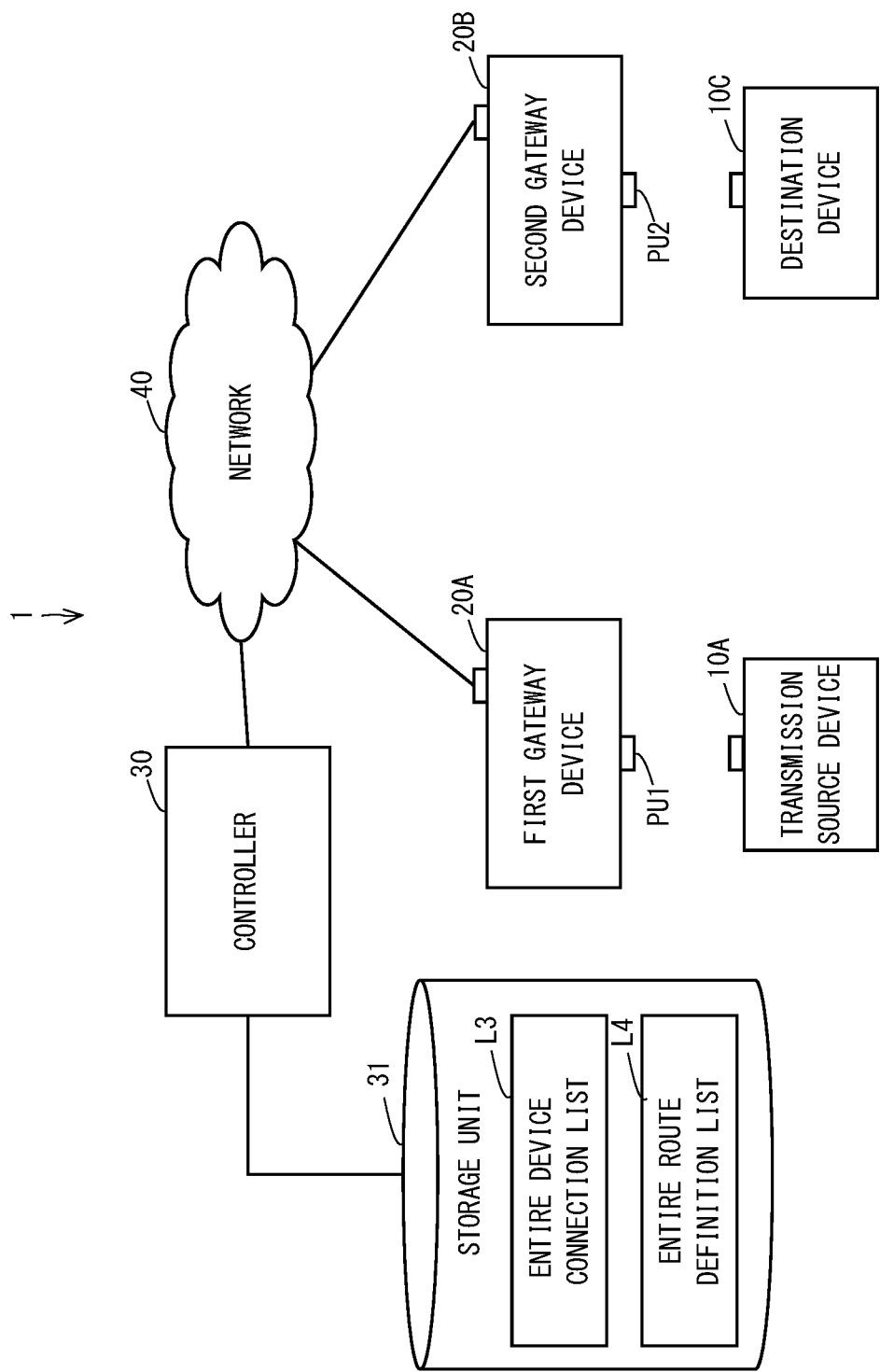
FIG. 1 is a schematic configuration diagram of a logical network construction system 1.

Hereinafter, a logical network construction system 1 according to the first embodiment of the present disclosure will be described with reference to the accompanying drawings. The corresponding components in each figure are denoted by the same reference numerals, and duplicate descriptions are omitted.

First, a configuration of the logical network construction system 1 will be described with reference to FIG. 1.

FIG. 1 is a schematic configuration diagram of the logical network construction system 1.

As shown in FIG. 1, the logical network construction system 1 includes a first gateway device 20A, a second gateway device 20B, a controller 30, a transmission source device 10A, a destination device 10C, a storage unit 31. The first gateway device 20A, the second gateway device 20B, the controller 30 are connected to a network 40 and communicate with each other via the network 40. The transmission source device 10A is connected to a first port PU1 of the first gateway device 20A and communicates with the first gateway device 20A. The destination device 10C is connected to a second port PU2 of the second gateway device 20B and communicates with the second gateway device 20B. An entire device connection list L3 and an entire route definition list L4 are stored in the storage unit 31.

Connection information for specifying the first gateway device 20A to which the transmission source device 10A is connected and the second gateway device 20B to which the destination device 10C is connected is registered in the entire device connection list L3. Information for specifying the destination device 10C with which the transmission source device 10A should communicate is registered in the entire route definition list L4.

The controller 30 constructs a logical network for communication between the transmission source device 10A connected to the first port PU1 of the first gateway device 20A and the destination device 10C connected to the second port PU2 of the second gateway device 20B on the basis of the entire device connection list L3 and the entire route definition list L4.

According to Embodiment 1, communication can be performed between the transmission source device 10A connected to the first gateway device 20A and the destination device 10C connected to the second gateway device 20B.

Embodiment 2

The logical network construction system 1 will now be described in more detail as Embodiment 2 of the present disclosure. A system is a general term for a mechanism in which various devices are connected via a network to utilize information and services.

Figure 2:
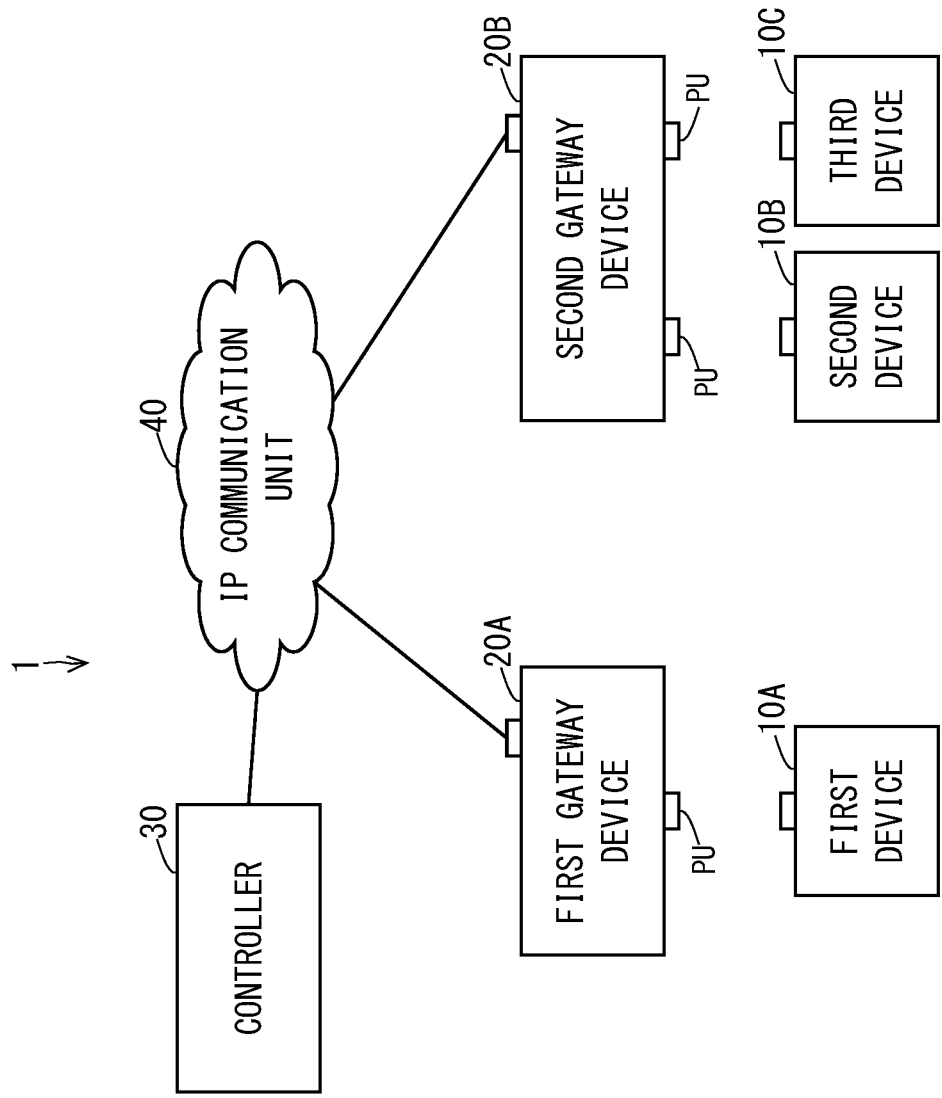
FIG. 2 is a detailed configuration diagram of the logical network construction system 1.

FIG. 2 is a detailed configuration diagram of the logical network construction system 1.

As shown in FIG. 2, the logical network construction system 1 includes first to third devices 10A to 10C, the first gateway device 20A to which the first device 10A is connected, the second gateway device 20B to which the second device 10B and the third device 10C are connected, the controller 30, and the IP communication unit 40 (For example, a network such as an IP network). The first gateway device 20A, the second gateway device 20B and the controller 30 are connected to the IP communication unit 40 and can communicate with each other through the IP communication unit 40.

In the logical network construction system 1, only by connecting the devices 10A to 10C to any of the gateway devices 20A, 20B, an appropriate logical network can be automatically constructed without worrying about the connected place.

First, a configuration example of the first to third devices 10A to 10C will be described.

Figure 3:
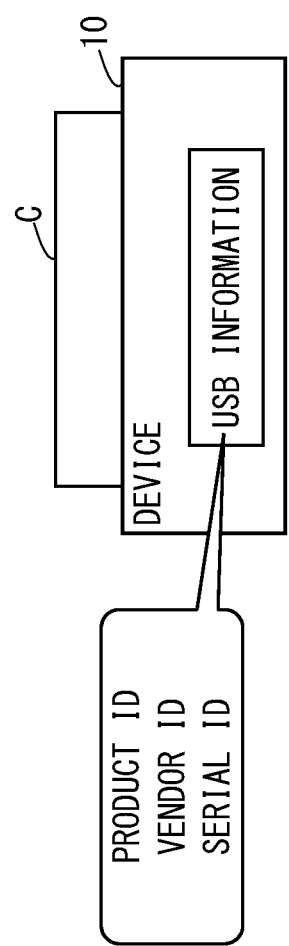
FIG. 3 is a schematic diagram of a device 10.

FIG. 3 is a schematic diagram of the device 10.

Since the configurations of the first to third devices 10A to 10C are common, hereinafter, when the first to third devices 10A to 10C are not distinguished, they are simply referred to as a device 10.

The device 10 is a generic name of equipment connected to the system by connecting to the gateway device 20. Examples include sensors, embedded devices, smartphones, personal computers, servers, and the like. The device 10 has a mechanism (Ethernet, Wi-Fi, Bluetooth (registered trademark), USB, etc.) for connecting to the gateway device 20.

The device 10 is, for example, a USB device. For example, the first device 10A is a USB device having a function as a measuring instrument. For example, the third device 10C is a USB device that stores and displays measurement information measured by the first device 10A.

As shown in FIG. 3, the device 10 has a USB connector C connected to the gateway device 20 (USB port PU).

The device 10 (USB connector C) is connected to the USB port PU of the gateway device 20, and communicates (communicates by the USB protocol) with the connected gateway device 20. For example, the first device 10A is connected to a USB port PU (Port identifier 10-1. See FIG. 4) of the first gateway device 20A, and communicates with the connected first gateway device 20A (communication by the USB protocol). The second device 10B is connected to a USB port PU (Port identifier 20-1. See FIG. 5) of the second gateway device 20B and communicates with the connected second gateway device 20B (communication by the USB protocol). The third device 10C is connected to a USB port PU (Port identifier 20-2. See FIG. 5) of the second gateway device 20B and communicates with the connected second gateway device 20B (communication by the USB protocol).

As shown in FIG. 3, the device 10 holds USB information. The USB information is a device identifier (Product ID, Vendor ID, Serial ID) for identifying the device 10, and is held in a memory (not shown) provided in the device 10, for example. For example, the first device 10A holds USB information 100 (see FIG. 4). The second device 10B holds USB information 200 (see FIG. 5). The third device 10C holds USB information 300 (see FIG. 5).

Next, a configuration example of the first and second gateway apparatuses 20A and 20B will be described.

Figure 4:
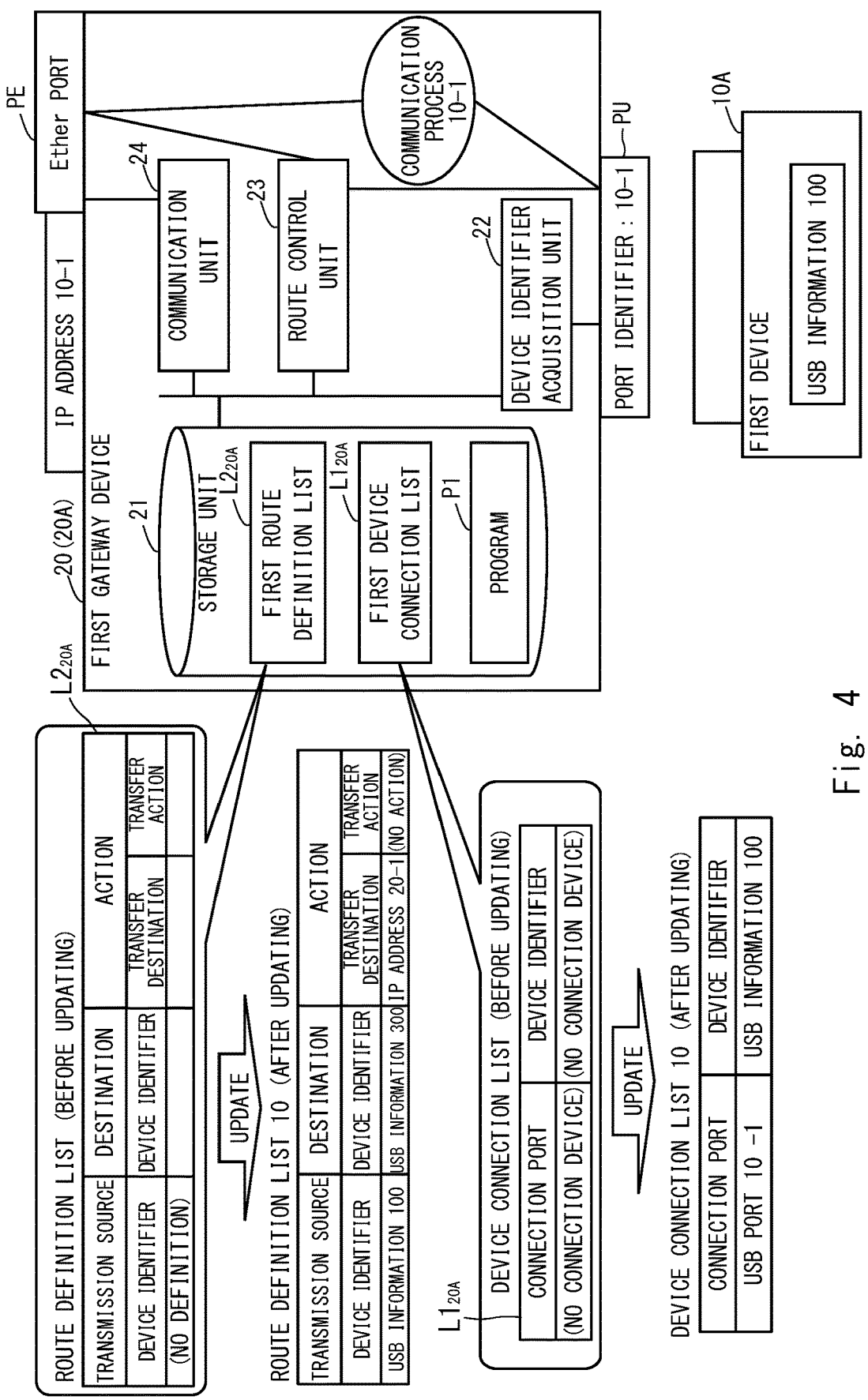
FIG. 4 is a schematic view of the first gateway device 20A.
Figure 5:
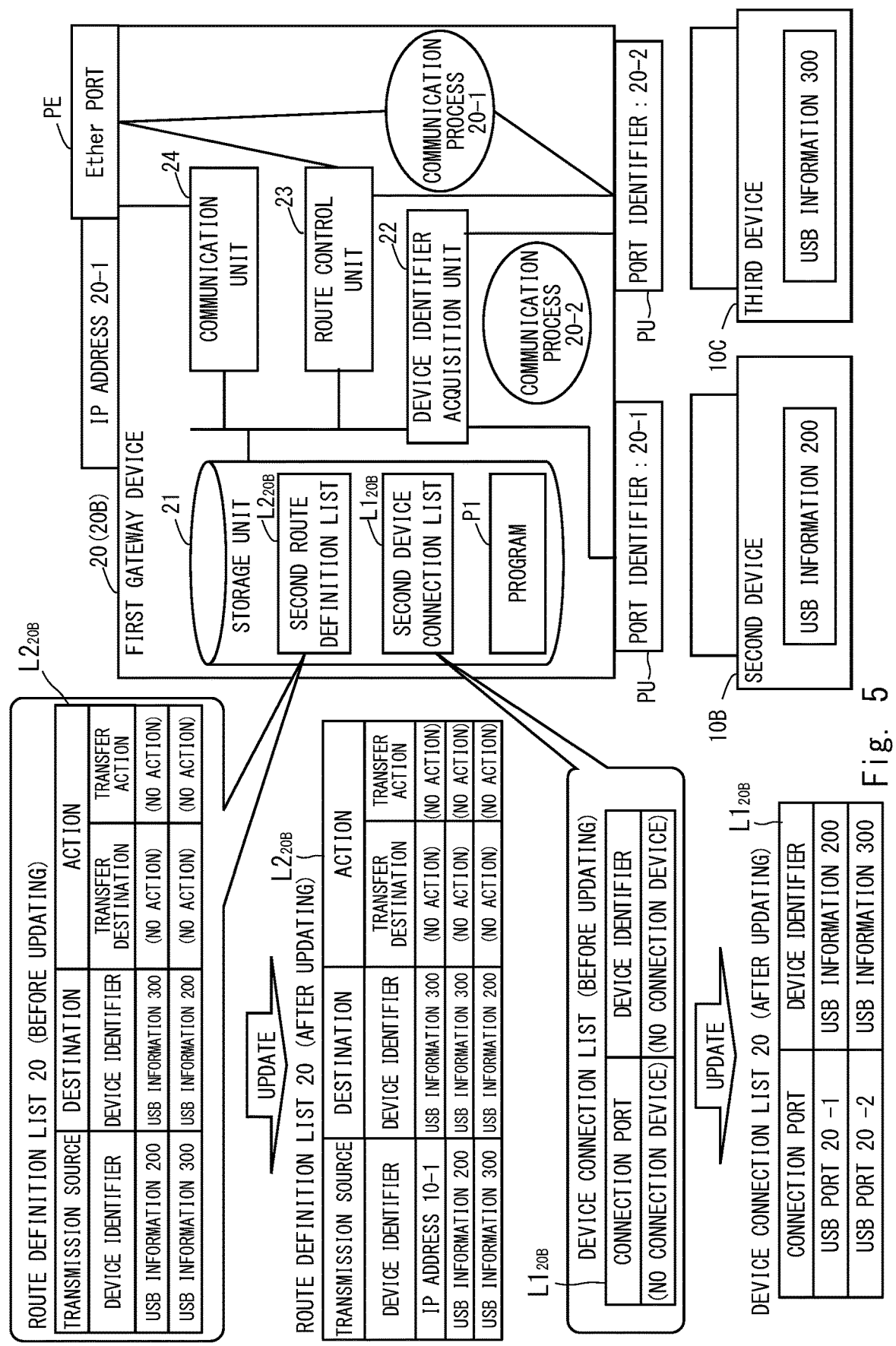
FIG. 5 is a schematic view of the second gateway device 20B.

FIG. 4 is a schematic view of the first gateway device 20A, and FIG. 5 is a schematic view of the second gateway device 20B.

The first and second gateway apparatuses 20A, 20B have a common configuration except that the number of USB ports PU is different. Therefore, in the following description, when the first and second gateway devices 20A and 20B are not distinguished, they are simply referred to as a gateway device 20.

The gateway device 20 is a generic name for devices that relay communications from the device 10 and serve as an entrance for the device 10 to connect to the system. For example, devices such as network switches, gateway servers, IoT gateways, and the like are applicable.

As shown in FIGS. 4 and 5, the gateway device 20 includes a port (USB Port PU, Ether Port PE), a storage unit 21, a device identifier acquisition unit 22, a route control unit 23, and a communication unit 24. A port is a generic term for a physical interface for connecting to other devices. Examples include LAN ports, USB ports, Wi-Fi modules, Bluetooth modules, etc.

In the second embodiment, a USB port PU and an Ether port PE are used as the ports.

As shown in FIG. 4, the first gateway device 20A includes one USB port PU (port identifier: 10-1). the first device 10A is connected to the USB port PU (port identifier: 10-1).

As shown in FIG. 5, the second gateway device 20B includes two USB ports PU (Port Identifiers: 20-1, 20-2). The second device 10B is connected to the USB port PU (port identifier: 20-1). The third device 10C is connected to the USB port PU (port identifier: 20-2). Hereinafter, the USB port PU to which the device 10 is connected is referred to as a connection port.

The IP communication unit 40 is connected to the Ether port PE. An IP address is assigned to the Ether port PE. For example, as shown in FIG. 4, the IP address 10-1 is allocated to the Ether port PE of the first gateway device 20A. As shown in FIG. 5, an IP address 20-1 is assigned to the Ether port PE of the second gateway device 20B.

The storage unit 21 is, for example, a nonvolatile storage unit such as a hard disk drive or ROM.

As shown in FIG. 4, a first device connection list $L1_{20A}$, a first route definition list $L2_{20A}$, and a program P1 are stored in the storage unit 21 of the first gateway device 20A. Similarly, as shown in FIG. 5, a second device connection list $L1_{20B}$, a second route definition list $L2_{20B}$, and a program P1 are stored in the storage unit 21 of the second gateway device 20B.

The first device connection list $L1_{20A}$ includes "connection port" and "device identifier" as items (see FIG. 4). The second device connection list $L1_{20B}$ is also similar (see FIG. 5). The port identifier of the connection port (USB port PU to which the device 10 is connected) is registered in the "connection port". The device identifier of the device 10 connected to the connection port is registered in the "device identifier". Processing for registering these items will be described later. Hereinafter, when the first device connection list $L1_{20A}$ and the second device connection list $L1_{20B}$ are not distinguished, they are simply referred to as the device connection list L1. Similarly, when the first route definition list $L2_{20A}$ and the second route definition list $L2_{20B}$ are not distinguished, they are simply described as the route definition list L2.

The first route definition list $L2_{20A}$ includes "device identifier" of a transmission source, "device identifier" of a destination, "transfer destination" and "transfer action" as items (see FIG. 4). The second route definition list $L2_{20B}$ is also similar (see FIG. 5). The device identifier of the device 10 (For example, the first device 10A) connected to the first gateway device 20A (USB port PU) is registered in the "device identifier" of the transmission source. The device identifier of the device 10 (For example, the third device 10C) to be communicated by the device 10 (For example, the first device 10A) connected to the first gateway device 20A (USB port PU) is registered in the destination device identifier. The network address (IP address) of the gateway device 20 (For example, the second gateway device 20B) is registered in the "transfer destination". The transfer action is registered in the "transfer action". Processing for registering these items will be described later.

The program P1 is a program executed by one or more processors (not shown) provided in the gateway device 20, and includes an OS (Operating System).

One or more processors (not shown) included in the gateway device 20 execute the program P1 read from the storage unit 21 into the RAM (not shown), thereby realizing the device identifier acquisition unit 22, the route control unit 23, and the communication unit 24. Some or all of these may be implemented in hardware.

The device identifier acquisition part 22 acquires the device identifier (USB information) of the device 10 from communication by the USB protocol between the device 10 connected to the gateway device 20 (USB port PU) and the gateway device 20.

The route control unit 23 monitors the communication by the communication process (For example, the communication process 10-1 shown in FIG. 4) generated in the gateway device 20, and controls the communication route by referring to the first device connection list $L1_{20A}$ and the first route definition list $L2_{20A}$.

The communication unit 24 communicates with the controller 30 via the IP communication unit 40. For example, the connection information of the device 10 connected to the gateway device 20 is transmitted to the controller 30. It also receives an instruction to construct a logical network transmitted from the controller 30.

The communication process 10-1 is generated, for example, in the first gateway device 20A. The generated communication process 10-1 relays data from the device 10 connected to the first gateway device 20A (USB port PU) and communicates with others. The communication process 10-1 attempts communication by specifying information (in this case, the USB information) held by the connection protocol (in this case, the USB protocol). Note that the communication process 10-1 may attempt communication by specifying information held by other connection protocols, for example, an IP address or MAC address for IP, an SSID or BSSID for Wi-Fi, or a BD address or handle number for Bluetooth. The route control unit 23 detects communication by the communication process 10-1. This is detected by existing technologies such as OS functions. For example, the route controller 23 detects information specified by the communication process 10-1. The above description of the communication process 10-1 (see FIG. 4) occurring in the first gateway apparatus 20A is also applicable to communication processes 20-1 and 20-2 (see FIG. 5) occurring in the second gateway apparatus 20B.

Next, a configuration example of the controller 30 will be described.

Figure 6:
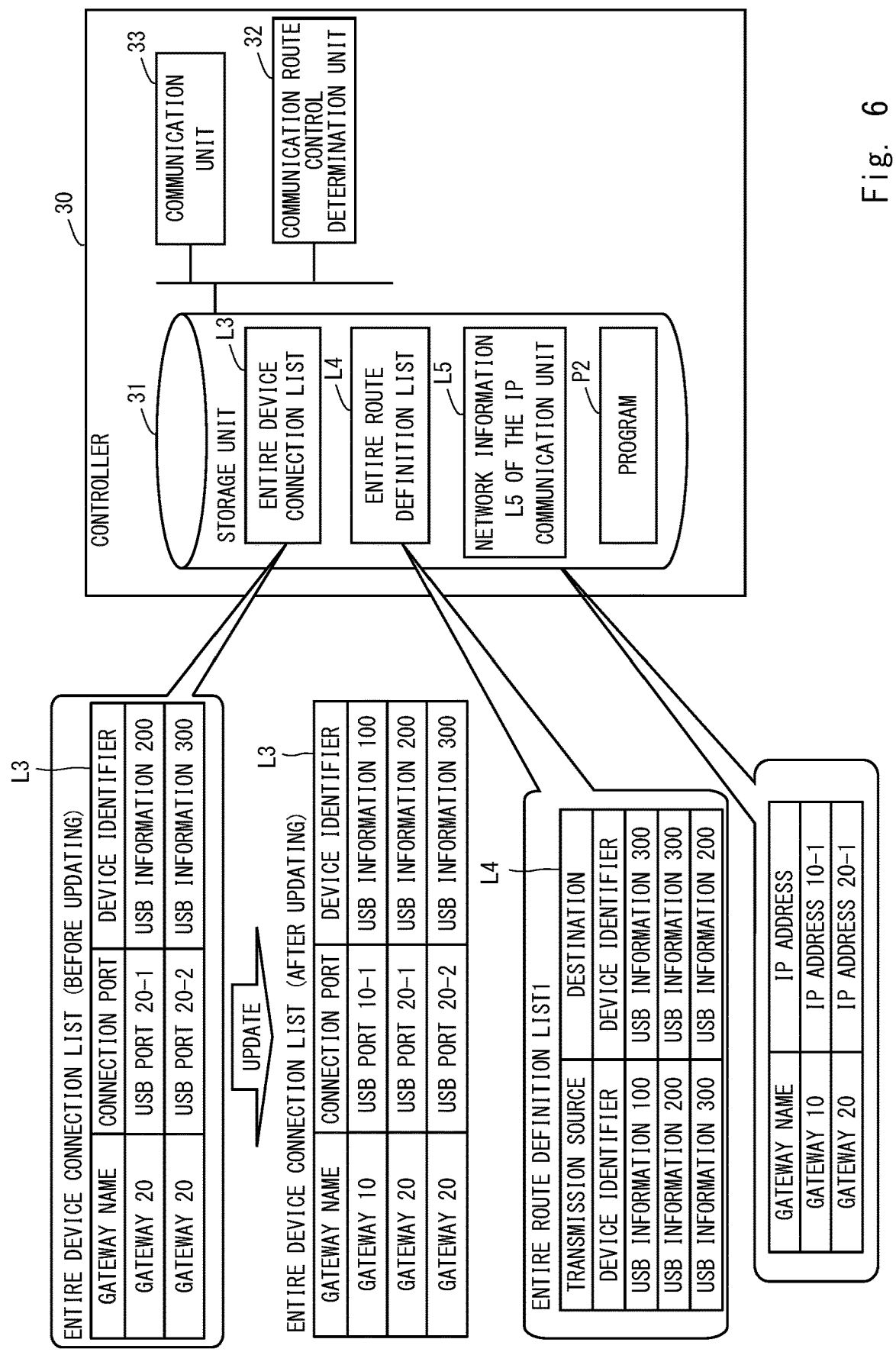
FIG. 6 is a schematic view of the controller 30.

FIG. 6 is a schematic view of the controller 30.

The controller 30 manages and controls the network of the entire system including not only IP (Internet Protocol) but also non-IP connections such as Wi-Fi, Bluetooth, USB (Universal Serial Bus), etc. For example, the controller 30 manages the connection status of the devices 10 of the entire system, the logical network, and the route control of the gateway device 20.

As shown in FIG. 6, the controller 30 includes a storage unit 31, a communication route control determination unit 32, and a communication unit 33.

The storage unit 31 is, for example, a nonvolatile storage unit such as a hard disk drive or ROM. The storage unit 31 stores an entire device connection list L3, an entire route definition list L4, network information L5 of the IP communication unit, and a program P2. For example, the controller 30 constructs a logical network for communication between the first device 10A connected to the USB port PU (port identifier 10-1) of the first gateway device 20A and the third device 10C connected to the USB port PU (port identifier 20-2) of the second gateway device 20B, based on the entire device connection list L3 and the entire route definition list L4.

Connection information for specifying the first gateway device 20A to which the source device (For example, the first device 10A) is connected and the second gateway device 20B to which the destination device (For example, the third device 10C) is connected is registered in the entire device connection list L3. Specifically, as shown in FIG. 6, the entire device connection list L3 includes "gateway name", "connection port" and "device identifier" as items. The gateway name (gateway identifier) of the gateway device 20 is registered in the "gateway name". The port identifier of the connection port of the gateway device 20 identified by the "gateway name" is registered in the "connection port". The device identifier of the device 10 connected to the connection port is registered in the "device identifier". Processing for registering these items will be described later.

Information for specifying a destination device (For example, the third device 10C) with which a source device (For example, the first device 10A) should communicate is registered in the entire route definition list L4. Specifically, as shown in FIG. 6, the entire route definition list L4 includes the "device identifier" of the source and the "device identifier" of the destination as items. The device identifier of the transmission source device 10 is registered in the "device identifier" of the transmission source. In the "device identifier" of the destination, the device identifier of the destination device 10 to be communicated by the source device 10 identified by the "device identifier" of the source is registered. These items are previously input and registered (set) by the user. The user is, for example, a network administrator of the system.

The network address (IP address) of the gateway device 20 is registered in the network information L5 of the IP communication unit. Specifically, as shown in FIG. 6, the network information L5 of the IP communication unit includes "gateway name" and "IP address" as items. The gateway name (gateway identifier) of the gateway device 20 is registered in the "gateway name". The IP address assigned to the gateway device 20 of the gateway name is registered in the IP address. This IP address may be pre-entered by the user or may be obtained from existing technology. For example, when the IP communication unit 40 higher than the gateway device 20 is controlled by OpenFlow of the existing technology, flow control information is obtained from an OpenFlow controller (not shown). Then, by utilizing this information, the communication route control determination unit 32 determines destination information (destination information for reaching the target gateway device 20) to be passed from the gateway device 20 to the IP communication unit 40.

The program P2 is a program executed by one or more processors (not shown) included in the controller 30, and includes an OS (Operating System).

One or more processors (not shown) included in the controller 30 execute the program P2 read into a RAM (not shown) from the storage unit 31. Thus, the communication route control determination unit 32 and the communication unit 33 are configured. Some or all of these may be constituted by hardware.

The communication route control determination unit 32 determines a control instruction to the gateway device 20 by referring to the entire device connection list L3 and the entire route definition list L4.

The communication unit 33 communicates with the gateway device 20 via the IP communication unit 40. For example, the communication unit 33 transmits an instruction to construct a logical network to the gateway device 20. The communication unit 33 receives the connection information of the device 10 connected to the gateway device 20 transmitted from the gateway device 20.

Next, as an operation of the logical network construction system 1 having the above configuration, an example of an operation when the first device 10A is connected to the transfer source gateway device 20A (USB port PU) will be described.

Figure 7:
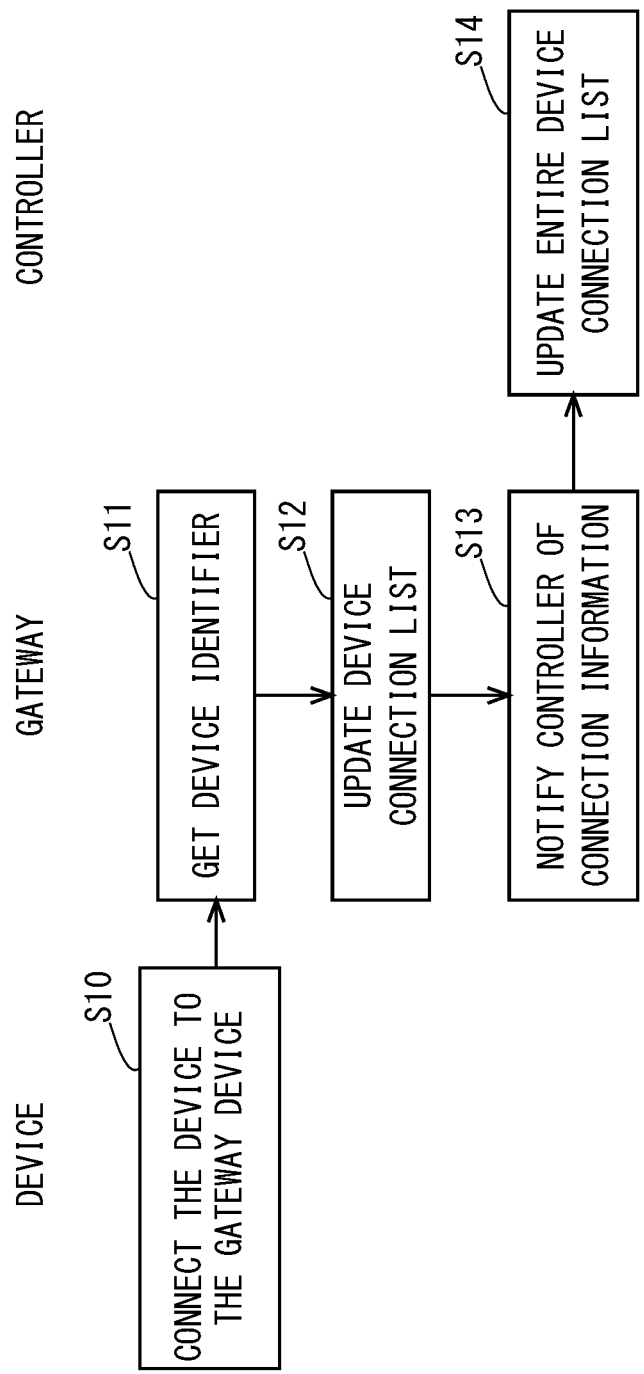
FIG. 7 is a flowchart of an example of the operation of the logical network construction system 1 (operation when the first device 10A is connected to the first gateway device 20A (USB port PU))

FIG. 7 is a flowchart of an example of the operation of the logical network construction system 1 (operation when the first device 10A is connected to the first gateway device 20A (USB port PU)).

First, the first device 10A is connected to the first gateway device 20A (USB port PU) (Step S10). Thus, communication using the USB protocol is started between the first device 10A connected to the first gateway device 20A (USB port PU) and the first gateway device 20A.

Next, the first gateway device 20A (device identifier acquisition unit 22) acquires the device identifier (USB information 100) of the first device 10A from the communication by the USB protocol between the first device 10A connected to the first gateway device 20A (USB port PU) and the first gateway device 20A (Step S11).

Next, the first gateway device 20A updates the first device connection list $L1_{20A}$ as shown in FIG. 4 (Step S12). Specifically, the first gateway device 20A registers the port identifier (USB port 10-1) of the connection port and the device identifier (USB information 100) of the first device 10A connected to the connection port in association with each other as connection information (information indicating which device 10 is connected to which USB port PU) in the first device connection list $L1_{20A}$. The device identifier (USB information 100) of the registered first device 10A is acquired in Step S11.

Next, the first gateway device 20A (communication unit 24) notifies the controller 30 of the connection information updated (registered) in Step S12 (Step S13). The connection information includes a port identifier (USB port 10-1) of the connection port and a device identifier (USB information 100) of the first device 10A connected to the connection port.

Next, upon receiving the connection information notified from the first gateway device 20A, the controller 30 updates the entire device connection list L3 as shown in FIG. 6 (Step S14). Specifically, the controller 30 registers the gateway name (gateway 10) of the first gateway device 20A, the port identifier (USB port 10-1) of the connection port, and the device identifier (USB information 100) of the first device 10A connected to the connection port in association with each other in the entire device connection list L3. The items registered in the entire device connection list L3, that is, the gateway name (gateway device 10) of the gateway device 20, the port identifier (USB port 10-1) of the connection port, and the device identifier (USB information 100) of the first device 10A connected to the connection port are acquired together with the connection information from the first gateway device 20A, for example.

As described above, when the first device 10A is connected to the first gateway device 20A (USB port PU), the first device connection list $L1_{20A}$ is updated (see FIG. 4), and the entire device connection list L3 is updated (see FIG. 6).

Similarly, when the second and third devices 10B, 10C are connected to the second gateway device 20B (USB port PU), the second device connection list $L1_{20B}$ is updated (see FIG. 5). In addition, the entire device connection list L3 is updated.

Next, as an operation of the logical network construction system 1 having the above configuration, an example of an operation when the communication process 10-1 is started (generated) in the first gateway apparatus 20A will be described.

Figure 8:
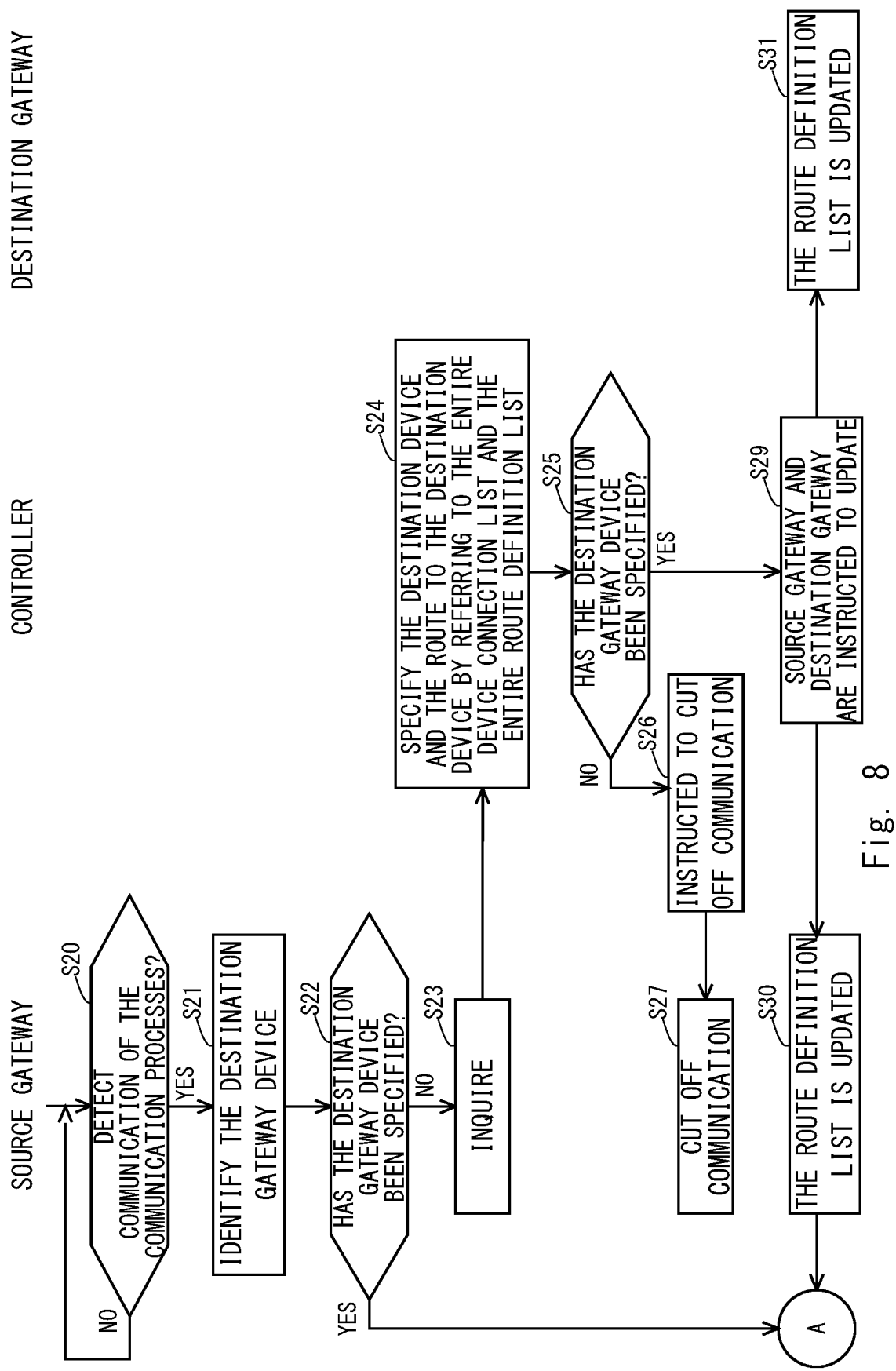
FIG. 8 is a flowchart of an example of an operation of the logical network construction system 1 (an operation when the communication process 10-1 is generated in the first gateway device 20A)
Figure 9:
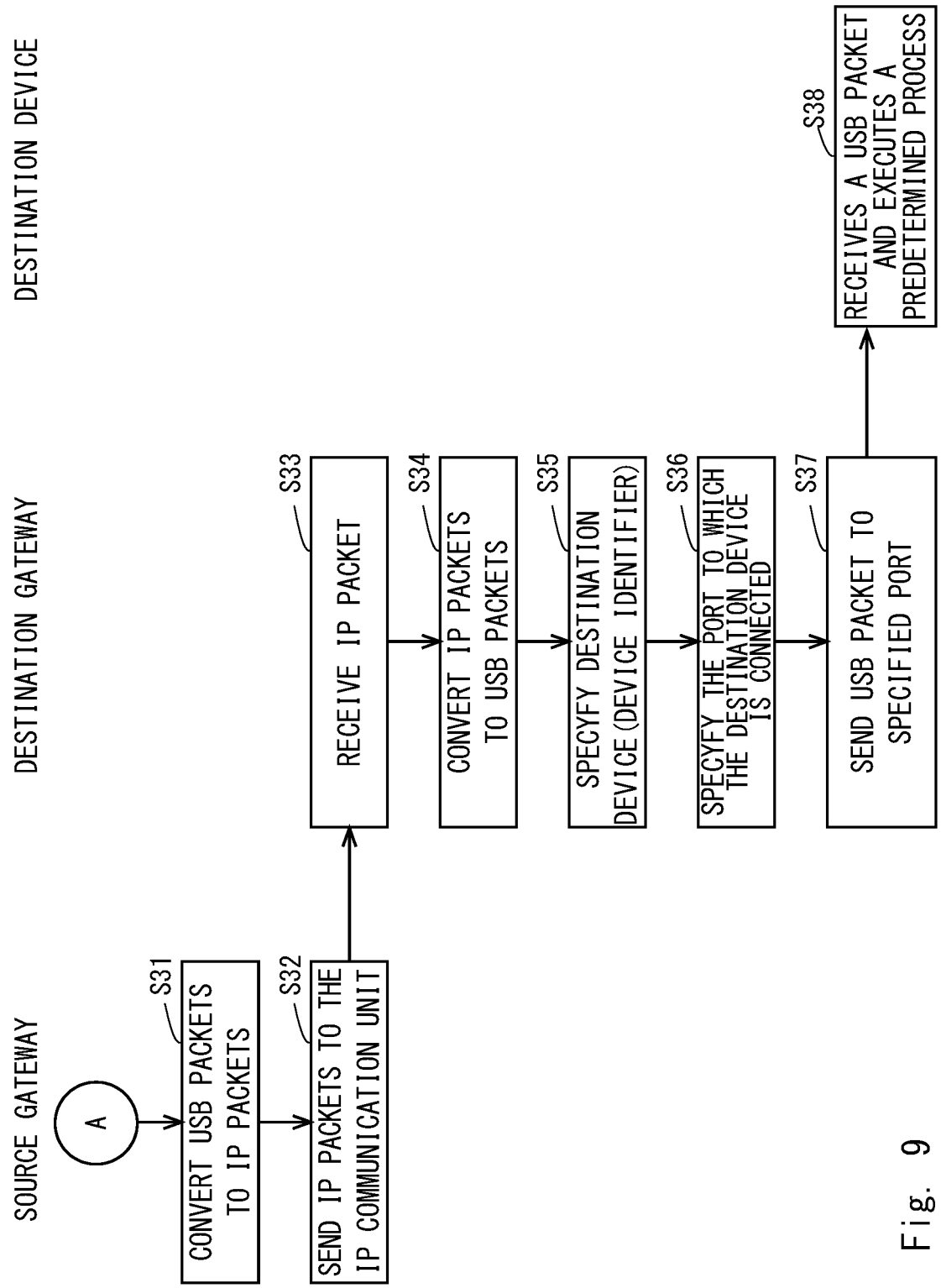
FIG. 9 is a flowchart of an example of an operation of the logical network construction system 1 (an operation when the communication process 10-1 is generated in the first gateway device 20A).

FIGS. 8 and 9 are flowcharts showing an example of an operation of the logical network construction system 1 (an operation when the communication process 10-1 is generated in the first gateway device 20A).

In the following description, it is assumed that the first to third devices 10A to 10C are connected to the first and second gateway devices 20A and 20B (USB ports PU).

First, it is assumed that a communication process 10-1 (see FIG. 4) for communicating from the first device 10A (Hereinafter also referred to as source device 10A) to the third device 10C (Hereinafter also referred to as destination device 10C) is generated in the first gateway device 20A (Hereinafter, it is also referred to as the transfer source gateway device 20A). Then, it is assumed that the transfer source gateway device 20A (route control unit 23) detects the generated communication of the communication process 10-1 (Step S20: YES).

Next, the transfer source gateway device 20A (route controller 23) specifies the second gateway device 20B (Hereinafter also referred to as the transfer destination gateway device 20B) by referring to the first device connection list $L1_{20A}$ and the first route definition list $L2_{20A}$ (Step S21). If it is specified (Step S22: YES), the process proceeds to the process shown in FIG. 9. The processing of FIG. 9 will be described later.

On the other hand, when it cannot be specified (Step S22: NO), for example, when nothing is registered in the first route definition list $L2_{20A}$ (In FIG. 4, refer to the first route definition list $L2_{20A}$ (before updating)), the transfer source gateway apparatus 20A (route control unit 23) transmits an inquiry to the controller 30 via the communication unit 24 in order to acquire the communication source and destination information to be relayed by the communication process 10-1 (Step S23). This inquiry includes the device identifier (USB information 100) of the source device 10A.

Next, the controller 30 (communication route control determining unit 32) that has received the inquiry refers to the entire device connection list L3 and the entire route definition list L4 to specify the destination device 10C with which the source device 10A should communicate and the route to the destination device 10C (transfer destination gateway device 20B to which the destination device 10C is connected) (Step S24).

Specifically, first, the destination device 10C (device identifier: USB 300) corresponding to the source device 10A (device identifier: USB 100) is specified by referring to the entire route definition list L4 (see FIG. 6).

Next, the transfer destination gateway device 20B (gateway name: gateway 20) corresponding to the specified destination device 10C (device identifier: USB 300) is specified by referring to the entire device connection list L3 (In FIG. 6, refer to the entire device connection list L3 (before updating)). The IP address of the specified transfer destination gateway device 20B (gateway name: gateway 20) is specified by referring to the network information L5 of the IP communication unit.

If the transfer destination gateway device 20B cannot be specified in Step S24 (Step S25: NO), for example, if the device identifier (USB information 100) of the source device 10A is not registered in at least one of the entire device connection list L3 and the entire route definition list L4, the controller 30 instructs the transfer source gateway device 20A to cut off communication (Step S26). Receiving this instruction, the transfer source gateway device 20A cuts off communication (Step S27).

On the other hand, if the transfer destination gateway device 20B can be specified in Step S24 (Step S25: YES), the controller 30 transmits an instruction (an control instruction of communication routes) to construct a logical network to the transfer source gateway device 20A to which the transmission source device 10A is connected and the transfer destination gateway device 20B to which the destination device 10C is connected so that the transmission source device 10A and the destination device 10C can communicate (so that a logical network is constructed between the source device 10A and the destination device 10C) (Step S29).

Next, the transfer source gateway apparatus 20A receiving the instruction from the controller 30 updates the route definition list $L2_{20A}$ as shown in FIG. 4 (Step S30). Specifically, the transfer source gateway device 20A registers the device identifier (USB information 100) of the source device 10A, the device identifier (USB information 300) of the destination device 10C, and the network address (IP address 20-1) of the transfer destination gateway device 20B in the route definition list $L2_{20A}$ in association with each other. The device identifier (USB information 100) of the source device 10A, the device identifier (USB information 300) of the destination device 10C, and the network address (IP address 20-1) of the transfer destination gateway device 20B are acquired together with instructions from the controller 30, for example.

On the other hand, the transfer destination gateway device 20B which has received the instruction from the controller 30 updates the second route definition list $L2_{20B}$ as shown in FIG. 5 (Step S31). Specifically, the transfer destination gateway device 20B associates the network address (IP address 10-1) of the transfer source gateway device 20A with the device identifier (USB information 300) of the destination device 10C and registers them in the second route definition list $L2_{20B}$. The network address (IP address 10-1) of the transfer source gateway device 20A and the device identifier (USB information 300) of the destination device 10 are acquired together with an instruction from the controller 30, for example.

As described above, when the communication process 10-1 is generated in the transfer source gateway apparatus 20A, the first and second route definition lists $L2_{20A}$ and $L2_{20B}$ are updated, respectively (See FIG. 4 and FIG. 5).

Thereafter, the transfer source gateway device 20A (route control unit 23) transfers the communication between the transmission source device 10A and the first gateway device 20A to the transfer destination gateway device 20B under the control of the communication process 10-1. This process will be described below with reference to FIG. 9.

As shown in FIG. 9, the transfer source gateway device 20A (route control unit 23) converts the USB packet included in the communication by the USB protocol from the transmission source device 10A into an IP packet (Step S31), and sends the converted IP packet to the IP communication unit 40 (Step S32).

The transmitted IP packet includes the IP address (IP address 10-1) of the transfer source gateway device 20A as the source IP address. It also includes the IP address (IP address 20-1) of the transfer destination gateway device 20B specified by referring to the first route definition list $L2_{20A}$ as the destination IP address.

As described above, the IP packet transmitted in Step S32 is delivered to the transfer destination gateway device 20B via the IP communication unit 40.

Next, the transfer destination gateway device 20B (communication unit 24) receives the IP packet sent from the transfer source gateway device 20A (Step S33).

The transfer destination gateway device 20B which has received the IP packet specifies the destination device 10C (the USB port to which the destination device 10C is connected) by referring to the second device connection list $L1_{20B}$ and the second route definition list $L2_{20B}$. Then, the transfer destination gateway device 20B transmits (sends) the communication (original USB packet converted from the IP packet) transferred from the transfer source gateway device 20A to the specified destination device 10C (USB port to which the destination device 10C is connected).

That is, first, the transfer destination gateway device 20B converts the IP packet received in Step S33 into an original USB packet (Step S34).

Next, the transfer destination gateway device 20B refers to the second route definition list $L2_{20B}$ to specify the destination device 10C (device identifier: USB 300) corresponding to the source IP address (IP address 10-1) of the IP packet received in Step S34 (Step S35).

Next, by referring to the second device connection list $L1_{20B}$, the transfer destination gateway device 20B specifies the USB port PU (port identifier: 20-2) corresponding to the destination device 10C (device identifier: USB 300) specified in Step S35, that is, the USB port PU (port identifier: 20-2) to which the destination device 10C (device identifier: USB 300) is connected (Step S36).

Next, the transfer destination gateway device 20B transmits the USB packet converted in Step S34 to the USB port PU (port identifier: 20-2) specified in Step S36 (Step S37). The destination device 10C receives the transmitted USB packet and executes a predetermined process (Step S38).

As described above, communication from the source device 10A to the destination device 10C can be established. That is, a logical network can be constructed for communication between the first device 10A connected to the USB port PU (port identifier: 10-1) of the first gateway device 20A and the third device 10C connected to the USB port PU (port identifier: 20-2) of the second gateway device 20B. Even if the communication process 10-1 attempts to communicate from the source device 10A (USB information 100) to the second device 10B (USB information 200), the communication is cut off (Step S27), so that no other influence is exerted.

According to Embodiment 2, communication can be performed between the source device 10A connected to one first gateway device 20A and the destination device 10C connected to the other second gateway device 20B.

According to Embodiment 2, only by connecting the device 10 to the gateway device 20 (USB port PU), an appropriate logical network can be automatically constructed without worrying about the connection location. That is, when the device 10 is connected to the gateway device 20 (USB port PU), the controller 30 automatically determines the route of the logical network and controls the gateway device 20 to automatically construct an appropriate logical network. Therefore, the user does not substantially register the setting information (configuration) (substantially zero configuration), and the appropriate logical network can be automatically constructed. Thus, the flexibility of the device 10 connection can be ensured.

According to Embodiment 2, the network to which the device 10 should belong is logically formed by using the identifier and the security setting information obtained from the connection protocol of the device 10 connected to the system without having to modify the device 10 in advance, the network is divided by the use and security level of each device 10, and the devices 10 can exist on the physical object without interfering with each other in accordance with policies such as the use and security level defined by the user.

According to the second embodiment, the following effects are achieved.

That is, if equipment and environments are prepared for each device application, a large amount of equipment and locations are required. Therefore, there is a demand to mix environments of multiple applications on the same physical equipment as much as possible (Issue 1).

It is also difficult to add a device identification function to a device according to its application. It's hard for device buyers to modify their devices. Even if you're a device manufacturer, you may not be able to add features, especially in the IoT space, due to low device performance and HW resources. Further, when a function is added to a device, it is often necessary to continuously update the built-in function, which causes trouble and problems in operation (Issue 2).

In addition, while conventional virtualization technology (For example, virtual machine technology, container technology, etc.) can be used to mix multi-use environments on the same physical device, using virtualization technology on a gateway is not suitable for environments where the connection point of devices may change or where a large number of devices are connected. In the virtualization technology, the port used by the virtual environment on the gateway can be freely set. However, the connection of the specific device is limited to the specific gateway and port configured. Therefore, if the user wants to set or change the connection point, the user who connects the device needs to ask the administrator of the virtual environment to reset the connection point one by one so that the user can connect to the terminal to which the user wants to connect. When the number of devices increases, a virtual environment is created for each gateway, and it becomes more troublesome to allocate ports for each use and to reconfigure port changes, and operation becomes impossible. Especially in the IoT field, there are cases where many devices are connected to unspecified places, which requires more flexibility when devices are connected to systems (Issue 3). With respect to the above-described Issue 1-3, according to Embodiment 2, the following effects are achieved.

First, by using a controller and a gateway for managing the entire network of the system including not only IP but also non-IP (Wi-Fi, Bluetooth, USB, etc.), a logical network can be automatically constructed so that a device connected to each gateway can communicate only with a predetermined appropriate partner connected somewhere in the system.

In addition, with respect to the Issue 2, information (identity information, security level) obtained from a connection protocol (Examples IP, MAC, Wi-Fi, Bluetooth, USB) with a gateway to which the device is connected is used to identify the device. Since the information of the connection protocol of the mechanism for connecting to the gateway which the device originally has is used, it can be used without modifying the device side. Thus, the above Issue 2 is solved.

Further, with respect to the Issue 3, each gateway acquires the identifier of the device connected to the gateway from the connection protocol, and sends the identifier and which port it is connected to the controller. The controller manages which devices are connected to which ports of each gateway (entire device connection list). When a device connects to one of the gateways, the controller refers to other devices that the device should communicate with that were previously configured by the user (the entire route definition list). Then, the controller determines the route to the device to be communicated by checking the entire device connection list. The controller instructs each gateway to control a communication route so as to configure a logical network between the connected device and the device to be communicated. Thus, no matter which gateway the device connects to, the controller automatically determines the route of the logical network and controls each gateway. As a result, it is possible to operate with practically zero configuration. Thus, the above Issue 3 is solved.

Thus, the environments of a plurality of applications can be mixed on the same physical apparatus. Thus, the above Issue 1 is solved.

Next, a modified example will be described.

The present disclosure is not limited to the above-described embodiments, and may be modified as appropriate without departing from the spirit. For example, although Embodiment 2 has described an example in which the first gateway device 20A and the second gateway device 20B are used as the gateway device 20, it is not limited thereto. Three or more gateway devices may be used as the gateway device 20. The number of USB ports provided in each gateway device 20 is not limited to 1 or 2, and 3 or more USB ports may be used.

Since the route definition can be set in both directions, permission for one-way communication and permission for two-way communication can be set separately. For example, in the entire route definition list L4 shown in FIG. 6, only one direction from the device 10 (device identifier 100) to the device 10 (device identifier 300) is permitted, but bidirectional communication is permitted between the device 10 (device identifier 200) and the device 10 (device identifier 300). If the communication process 20-1 (see FIG. 5) attempts to communicate from the device 10 (device identifier 300) to the device 10 (device identifier 100), it is interrupted. If the communication process 20-2 (see FIG. 5) attempts to communicate bidirectionally with the device 10 (device identifier 200) and the device 10 (device identifier 300), communication can be performed.

In addition, connection protocols other than USB can also be dealt with by making the device identifier information obtainable from the respective connection protocols. For example, in the case of Bluetooth, a BD address, a device class (Audio equipment, mouse, etc.), a pairing method, an encryption algorithm, etc., and in the case of Wi-Fi, an SSID, a wireless LAN standard, an authentication protocol, an encryption protocol, an encryption algorithm, etc., and in addition, various identifiers according to the standard of the connection protocol, such as an IP address, a MAC address, a physical port, a VLAN, a protocol number, a ToS value, a port number, etc., can be used.

In addition, it is not necessary to use all the information obtained from the connection protocol in the entire route definition list L4 or the route definition list L2 of the gateway device 20. For example, in the case of Bluetooth, only the combination of the BD address and the encryption algorithm is set in the entire route definition list L4 of the controller 30. Thus, the communication route control determining unit 32 determines the route by the BD address and the encryption algorithm without using other information such as the pairing method used in the Bluetooth protocol.

Since Bluetooth, Wi-Fi, etc. include information on communication standards (version, etc.), authentication (authentication protocol, etc.), and encryption (Algorithm, with/without encryption, etc.), it is possible to divide the network by the security level of the connection. This allows devices with higher security connections to communicate with servers handling sensitive information, while devices with lower security connections can isolate their networks.

Although communication (communication from the USB device 10 to another USB device 10) and communication (communication to a similar connection protocol) have been described in Embodiment 2, communication from the USB device 10 to a Wi-Fi device (not shown) or the like can be controlled by the same mechanism. For example, the user sets the identifier of the USB device as the source of the entire route definition list L4 of the controller 30 and sets the identifier of the Wi-Fi device as the destination. Thus, communication from the USB device 10 to the Wi-Fi device can be controlled.

In addition, it is possible to cooperate with existing technologies such as VLAN of the IP communication unit 40. Thus, a detailed logical network can be constructed. For example, the IP communication unit 40 allocates a VLAN to the IP communication unit 40 for each route set in the entire route definition list L4 of the controller 30. Then, the VLAN is set to the item "forwarding treatment" of the route definition list L2 of the gateway device 20. Thus, when the gateway device 20 transfers a specific communication to the IP communication unit 40, the VLAN registered (described) in the item "transfer treatment" of the route definition list L2 is attached and transferred to the IP communication unit 40. Thus, the IP communication unit 40 can perform route control using the VLAN.

When the entire route definition list L4 is updated by the user, the route definition list L2 of each gateway device 20 is updated according to the updated contents. Specifically, the communication route control determination unit 32 of the controller 30 checks whether the updated identifier exists in the entire device connection list L3, and if the device 10 having the corresponding identifier exists in the entire device connection list L3, it determines the route according to the updated route definition list L3 and issues an update instruction to the related gateway device 20 for the route definition list L2.

In addition, a device connected by a suspicious device that is not generally intended may contain a virus, for example. In this case, from a security point of view, the connected devices are separated from the network to prevent other devices and systems from being affected. In the present disclosure, when the information of the identifier of the connected device 10 is not present in the entire route definition list L4 of the controller 30, the communication of the connected gateway device 20 is limited to the communication part with the controller 30 and all other parts are cut off. Thus, the gateway device 20 can be virtually separated from the network.

Although the present invention has been described with reference to the embodiments, the present invention is not limited by the above. The structure and details of the present invention may be modified in various ways that will be understood by those skilled in the art within the scope of the invention.

This application claims priority on the basis of Japanese Application Serial No. 2020-046027, filed on Mar. 17, 2020, the disclosure of which is incorporated herein in its entirety.

REFERENCE SIGNS LIST

1 LOGICAL NETWORK CONSTRUCTION SYSTEM
10 DEVICES
PU USB PORT
10A FIRST DEVICE (SOURCE DEVICE)
10B SECOND DEVICE
10C THIRD DEVICE (DESTINATION DEVICE)
20 GATEWAY DEVICE
20A FIRST GATEWAY UNIT (SOURCE GATEWAY UNIT)
20B SECOND GATEWAY UNIT (DESTINATION GATEWAY UNIT)
21 STORAGE UNIT
22 DEVICE IDENTIFIER ACQUISITION UNIT
23 ROUTE CONTROLLER
24 COMMUNICATION UNIT
30 CONTROLLER
31 STORAGE UNIT
32 COMMUNICATION ROUTE CONTROL DETERMINATION UNIT
33 COMMUNICATION UNIT
40 IP COMMUNICATION UNIT (NETWORK)
L1 DEVICE CONNECTION LIST
L1$_{20A}$ FIRST DEVICE CONNECTION LIST
L1$_{20B}$ SECOND DEVICE CONNECTION LIST
L2 ROUTE DEFINITION LIST
L2$_{20A}$ FIRST ROUTE DEFINITION LIST
L2$_{20B}$ SECOND ROUTE DEFINITION LIST
L3 ENTIRE DEVICE CONNECTION LIST
L4 ENTIRE ROUTE DEFINITION LIST
L5 NETWORK INFORMATION
P1, P2 PROGRAM

The invention claimed is:

1. A logical network construction system comprising:
a first gateway device, a second gateway device, and a controller connected to a network and communicating with each other via the network;
a transmission source device connected to a first port of the first gateway device and communicating with the first gateway device;
a destination device connected to a second port of the second gateway device and communicating with the second gateway device;
a storage unit in which an entire device connection list and an entire route definition list are stored; wherein
in the entire device connection list, connection information for specifying the first gateway device to which the transmission source device is connected and the second gateway device to which the destination device is connected is registered,
in the entire route definition list, information for specifying the destination device with which the transmission source device should communicate is registered, and
the controller constructs a logical network for communication between the source device connected to the first port of the first gateway device and the destination device connected to the second port of the second gateway device based on the entire device connection list and the entire route definition list.

2. The logical network construction system according to claim 1, wherein
in the entire device connection list, a gateway identifier of the first gateway device, the port identifier of the first port, and a device identifier of the transmission source device are registered in association with each other, and a gateway identifier of the second gateway device, a port identifier of the second port, and a device identifier of the destination device are registered in association with each other, and
in the entire route definition list, the identifier of the source device and the identifier of the destination device are registered in association with each other.

3. The logical network construction system according to claim 1, wherein
the first gateway device includes a storage unit in which a first device connection list and a first route definition list are stored,
the second gateway device includes a storage unit in which a second device connection list and a second route definition list are stored,
the controller transmits an instruction to construct the logical network to the first gateway device and the second gateway device,
in the first route definition list, the device identifier of the transmission source device, the device identifier of the destination device, and the network address of the second gateway device which is the transfer destination gateway device are registered in association with each other by the first gateway device which has received the instruction,
in the second route definition list, the network address of the first gateway device which is the transfer source gateway device and the device identifier of the destination device are registered in association with each other by the second gateway device which has received the instruction,
in the first device connection list, the port identifier of the first port and the device identifier of the transmission source device are registered in association with each other by the first gateway device,
in the second device connection list, the port identifier of the second port and the device identifier of the destination device are registered in association with each other by the second gateway device,
the first gateway device specifies the second gateway device which is a transfer destination gateway device by referring to the first device connection list and the first route definition list, and transfers communication between the transmission source device and the first gateway device to the second gateway device which is the specified transfer destination gateway device, and the second gateway device specifies the destination device by referring to the second device connection list and the second route definition list, and transfers communication transferred from the first gateway device to the specified destination device.

4. The logical network construction system according to claim 3, wherein the identifier of the source device registered in the first device connection list is obtained from communication by a predetermined protocol between the source device and the first gateway device, and the identifier of the destination device registered in the second device connection list is acquired from communication by a predetermined protocol between the destination device and the second gateway device.

5. The logical network construction system according to claim 1, wherein the gateway identifier of the first gateway device, the port identifier of the first port, and the device identifier of the transmission source device are acquired from the first gateway device and registered in the entire device connection list, and the gateway identifier of the second gateway device, the port identifier of the second port and the device identifier of the destination device are acquired from the second gateway device and registered in the entire device connection list.

6. A gateway device comprising:

a storage unit that stores a first route definition list in which the device identifier of the source device, the device identifier of the destination device, and the network address of the transfer destination gateway device are registered in association with each other, and a first device connection list in which the port identifier of the first port and the device identifier of the source device are registered in association with each other; wherein the transfer destination gateway device is specified by referring to the first route definition list and the first device connection list, and the communication between the transmission source device and the transfer source gateway device is transferred to the specified transfer destination gateway device.

7. The gateway device according to claim 6, wherein the identifier of the transmission source device registered in the first device connection list is obtained from communication by a predetermined protocol between the transmission source device and the transmission source gateway device.

8. A controller comprising:

a storage unit that stores an entire device connection list and an entire route definition list in which information for specifying the destination device with which the source device is to communicate is registered in which connection information for specifying a first gateway device to which a source device is connected and a second gateway device to which a destination device is connected is registered; wherein on the basis of the entire device connection list and the entire route definition list, an instruction for constructing a logical network for communication between the source device connected to the first port of the first gateway and the destination device connected to the second port of the second gateway is transmitted to the first gateway device and the second gateway device.

9. The controller according to claim 8, wherein in the entire device connection list, the gateway identifier of the first gateway device, the port identifier of the first port, and the device identifier of the transmission source device are registered in association with each other, and the gateway identifier of the second gateway device, the port identifier of the second port, and the device identifier of the destination device are registered in association with each other, and in the entire route definition list, the identifier of the source device and the identifier of the destination device are registered in association with each other.

* * * * *